(12) United States Patent
Schilleci, Jr.

(10) Patent No.: US 6,388,423 B1
(45) Date of Patent: May 14, 2002

(54) BATTERY MONITOR AND OPEN CIRCUIT PROTECTOR

(76) Inventor: John W. Schilleci, Jr., 5504 Toby La., Kenner, LA (US) 70065

( * ) Notice: Subject to any disclaimer, the term of this patent is extended or adjusted under 35 U.S.C. 154(b) by 0 days.

(21) Appl. No.: 09/792,515

(22) Filed: Feb. 23, 2001

(51) Int. Cl.$^7$ ................................................. H02J 7/00
(52) U.S. Cl. ...................................... 320/122; 320/116
(58) Field of Search ................................ 320/116, 122, 320/120, 118

(56) References Cited

U.S. PATENT DOCUMENTS

| | | | |
|---|---|---|---|
| 3,784,892 A | 1/1974 | Zelina | 320/40 |
| 4,370,723 A | 1/1983 | Huffman et al. | 364/483 |
| 4,475,047 A | 10/1984 | Ebert, Jr. | 307/66 |
| 4,707,795 A | 11/1987 | Alber et al. | 364/550 |
| 4,772,978 A | 9/1988 | Oura et al. | 361/36 |
| 5,315,533 A | 5/1994 | Stich et al. | 364/480 |
| 5,550,476 A | 8/1996 | Lau et al. | 324/522 |
| 5,602,462 A | 2/1997 | Stich et al. | 323/258 |
| 5,612,580 A | 3/1997 | Janonis | 307/64 |
| 5,744,936 A | 4/1998 | Kawakami | 320/120 |
| 5,821,733 A | 10/1998 | Turnbull | 320/116 |
| 5,880,575 A | 3/1999 | Itou et al. | 320/122 |
| 6,002,260 A | 12/1999 | Lau et al. | 324/522 |
| 6,011,480 A | 1/2000 | Schweitzer et al. | 340/644 |
| 6,014,013 A | 1/2000 | Suppanz | 320/122 |
| 6,046,514 A | 4/2000 | Rouillard | 307/77 |

*Primary Examiner*—Gregory Toatley
(74) *Attorney, Agent, or Firm*—Garvey, Smith, Nehrbass & Doody, L.L.C.

(57) ABSTRACT

A battery open circuit protector for an electrical power distribution system which consists of a number of back-biased diodes in series/parallel arrangement across segments of individual battery cells in a battery. Each diode is back-biased across a segment of individual cells number about 10% to about 15% of the total number of cells making up the battery. Additionally, a voltage divider network analogous to a Wheatstone bridge is connected to the battery and a system distribution control panel wherein the network is connected to the midpoint of the battery cells and includes voltage/current divider resistors to establish monitoring circuits and precision resistors to measure the currents.

20 Claims, 2 Drawing Sheets

BATTERY MONITOR AND OPEN CIRCUIT PROTECTOR

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION:

Field of the Invention

Electric utility companies supply power which their or other generating systems produce. The power is commonly transmitted through a grid of electrical high voltage alternating (AC) three-phase power lines. Occasionally a generation, transmission or distribution facility experiences a fault in a power line, switching or operating equipment which may, for example, result in a short circuit or other equipment failure on the power line. Monitoring systems include sensing and system management equipment to isolate a problem or reroute the power transmission or distribution. These power management systems include circuit breakers or switches to effect this circuit isolation or rerouting, and the sensed fault or abnormality on a line or at a substation may cause a monitoring station to trip a circuit breaker, either rerouting or causing power interruption to a customer. Some faults, in particular high impedance faults, can occur when a power line falls onto a high impedance surface such as dry grass or an asphalt road, but the wire remains energized because the high impedance surface insulates the wire to prevent it from generating a short circuit efficient to cause the circuit to trip. Utility companies attempt to identify such faults and quickly shut down the affected line to remove the hazard of the live line on the ground.

A variety of fault sensors have been developed to detect and signal power line faults. These sensors are read in a variety of substation or central station distribution panels. The heart of the protective system operation, in the event of fault, is a battery system in such as a substation at the transmission or distribution facilities or at the central station or the generation point. Battery systems perform a critical role in these fault or emergency situations. When emergencies do occur, it is essential that the battery systems perform as designed or serious consequences result in the substations since the batteries supply the power necessary to trip or close switches and circuit breakers which effect the opening of circuits to isolate or reroute the power.

It should be understood that the heart of any transmission or distribution substation is the station battery. As one or more of the distribution system monitors, either at the generation point or some other point in the transmission system, detects abnormalities on a section of the system, corrective action is taken. This corrective action may be either manually implemented or automatically, based upon the inputs to a computerized control system. The corrective action in respect of the transmission system, is the shutting down of various components, including substations, and/or rerouting the power distribution. Since the AC power within the system supplies the process power to various of the monitors and operating equipment within the system, it stands to reason that in those situations where the system is experiencing short circuits or other faults, the system power cannot be relied upon to operate the switches and circuit breakers to either shut down or reroute power distribution. It is the station battery in these circumstances which directly provides the power necessary to reposition circuit breakers and other switches, thus should the battery system fail during a fault on the system, there may be no way of clearing the fault or short circuit leaving the system vulnerable to major burn down of the facilities and widespread blackouts. The huge fault currents occurring with hard short circuits can easily cause meltdown in transformers, distribution circuits and substation busses resulting in a major meltdowns or fires in a substation or along the distribution route, resulting in not only loss of facilities, but widespread blackouts and potential injury to personnel.

Because of the importance of good reliability of battery system, numerous maintenance programs are performed to evaluate the batteries and battery systems. Many of these are performed under static conditions such as by taking specific gravity readings, cell voltage measurements, and electrolyte level maintenance. In addition to these static tests, the voltage and the charge current to the station batteries is also monitored as an indicator of the system status. In their usual arrangements, the battery back-ups consist of a number of common lead-acid wet cells connected in series to provide the voltage and current necessary to operate the switches and circuit breakers. Such systems may include multiples of three or six cell packs each having voltages of 6 or 12 volts connected in series providing such as 120 volts and 120 to 150 ampere-hours of DC power. Such batteries exhibit some similarities to those conventionally installed in automobiles and are known to periodically exhibit short circuits or increased resistance within individual cells. As is also well known, such faults affect the ability of the battery containing one of these cells to provide the rated output when called upon, and may well cause the degradation of the remaining components of the battery.

Standby storage batteries are designed to deliver energy to a load over a relatively long period of time at a slowly declining voltage, in contrast with the short-duration, high discharge typically provided by automotive batteries. Each standby storage battery includes one or more chemical cells, with multiple cells being connected in series so that the overall voltage, measured across the battery terminals, is equal to the sum of the individual cell voltages. Individual batteries are further connected together in series to form a battery bank having the level of voltage for the particular station battery.

The voltage measured across the positive and negative terminal of a battery cell, is a characteristic of the chemistry for that cell. In lead-acid batteries, the voltage across the terminals for a single cell is about 2 volts, while in a nickel-cadmium cell, the voltage is about 1.2 volts. In each cell, positive and negative reactants are bound together into positive and negative plates. Plates of like polarity are attached to a rigid, metallic supporting strap, which is fitted with a terminal post for connection to external loads. The assemblies of positive and negative plates with their respective straps and terminal posts are suspended in a jar or similar container, containing an electrolyte, and the plates are separated so that no direct contact between them occurs. Contact between plates of dissimilar polarity would result in a short circuit, rapidly discharging the cell and rendering it ineffective. The containers containing the cells are closed with a cover however, the terminal posts protrude for the connection to the external load.

When an electrical load is connected to the terminals of the battery, a chemical reaction occurs between the electrolyte and the materials making up the battery plates to make an electrical current flow between the plates of opposite polarity and thus through the terminals and the load. The battery "discharges" by providing the DC current to the load, as the flow of active materials in the electrolyte and the plates equalize. By connecting a battery charger to the terminals of the battery, and effectively causing a reversed current to flow through the cells, between the oppositely charged plates, the reverse chemical reaction occurs and the battery becomes recharged.

A storage battery, like any source of electrical energy, has an internal impedance, which includes resistive, inductive and capacitive components. As the battery discharges, the current produces a voltage drop across the internal resistance of the battery in accordance with Ohms law. This voltage drop causes the voltage across the battery terminals to be somewhat less than ideal, i.e., the expected voltage, and the voltage drop consequently diminish the ability of the battery to power the load. The internal resistance of a storage battery at the time of manufacture is made as low as possible to minimize the voltage dropped during battery discharge. Over the life of the battery however, the internal resistance will increase, at a rate determined by such factors as how many times the battery undergoes cycles of discharging and charging, the effects of continuous charging on the electrical conductivity of internal cell connections, and the temperature of the electrolyte. The internal resistance of any cell will eventually increase to a level where the voltage drop across it during discharge is so great that the battery can no longer deliver power at its rated capacity. In most cases, internal cell resistance will not cause serious problems until the battery is near the end of its useful life.

If the battery circuit opens, (an internal battery condition involving the plates), the battery will no longer be able to discharge power into the load, and will consequently be useless as a standby energy source. Moreover, flammable gases released during the charging reactions may accumulate within the battery jar, and may ignite when internal connections burn (as by ohmic heating), causing an explosion that may damage equipment and injure personnel. Since station batteries include several battery cells in series, an open in any individual cell renders the entire series useless and unable to provide current to a load.

For the above reasons, it is important to have continuing information on the cell performance of the several cells making up a standby battery and means for the continuation of the supply of battery current in the event of an open cell. In recognition of the importance of monitoring the standby battery, numerous techniques and inventions have been developed. As will be recognized in the following review of the prior art, the several techniques and inventions are increasingly more complex, and therefore more expensive, difficult to install and maintain and consequently potentially conflicting in effectiveness. Likewise, as presently known prior to my invention thereof, no comparable means are currently available to overcome an open cell in a serial battery system.

U.S. Pat. No, 4,968,943 to Russo discloses an open battery bank detector. Russo's non-intrusive open battery bank detector senses an alternating current component of the DC trickle charge carried by one of a pair of cables connected between the battery charger and the bank of batteries. When the AC component reaches a threshold level, a sensor circuit trips a relay which activates an alarm.

U.S. Pat. No. 4,546,309 to Kang discloses an apparatus and a method for locating ground faults. The Kang device utilizes a low frequency current generator having a variable output, a Hall-effect current probe for detecting the low frequency current produced by the generator, a filter and an amplifier connected to the output of the Hall-effect current probe for identifying and amplifying the low frequency signal. A readout element is connected to the output of the amplifier to indicate the relative magnitude of the low frequency signal.

U.S. Pat. No. 4,697,134 to Burkum discloses an apparatus and a method for measuring battery condition. The Burkum device measures the impedance of secondary cells that form the battery. The impedance measurement is made at a frequency selected to be different from those frequencies otherwise present in the charger-load circuit. A first application of the testing device monitors the battery for a change in impedance that can signal a developing defect in one or more individual cells or intercell connections. In a second application, the testing device is utilized to compare the impedance of individual cells and electrical connections to locate faulty components. A digital measurement of the measured AC current at the selected frequency is supplied to a computer or a digital system. A digital version of the measured voltage across the battery at the selected frequency is also supplied to the computer. The computer divides the voltage by the current measurement and records or logs the resulting impedance value on a regular basis.

U.S. Pat. No. 5,214,385 to Gabriel discloses an apparatus and a method for utilizing a polarization voltage to determine charge state of a battery. The test signal is a continuous square wave signal having a frequency less and 3 Hz. The test signal alternates between a voltage adequate to charge the battery and a lower voltage. The charging voltage is retained for a time sufficient to allow a polarization voltage to develop across individual battery cells.

U.S. Pat. No. 5,281,920 to Wurst discloses an on-line battery impedance measurement device. The impedance of battery cells within a battery bank is measured by dividing the bank into at least two battery strings. A load current is imposed on one of the battery strings and the battery cell voltage is measured within that string.

U.S. Pat. No. 5,574,355 to McShane discloses a method and an apparatus for the detection and control of thermal runaway in a battery under charge. The circuit determines the internal resistance or impedance and conductance (admittance) of the battery during the charge cycle.

U.S. Pat. No. 5,969,625 to Russo which discloses method and apparatus for injecting and detecting an audio frequency current signal carried by the battery bus and detecting a voltage drop. The audio current is injected by means of current transformers and an oscillator, detected by means of comparators and operational amplifiers and a signal is generated to represent the voltage and current signals. A microprocessor system is utilized to monitor the float voltage of the battery to assess stability.

The present invention enables a significantly more direct and simplified monitoring of the battery cells to ensure that a sufficient charge is being maintained as well as monitoring the cells for internal short circuits and resistance buildups. Further, the present invention provides a warning of internal irregularities within the cell system and includes by-pass means around problematic cells should such irregularities occur in a period when the system is called upon to provide power for circuit breaker or switch operation, thereby providing improved system reliability even though internal battery problems have occurred.

SUMMARY OF THE INVENTION

The present invention provides a fail-safe adaptation to a standby battery system, particularly of the type utilized in an electric power distribution system as well as enhanced monitoring of the system status. In the present context, electric power distribution system includes the related aspects of power generation and power transmission, since these facets are viewed as but subsets of the distribution scenario in respect that as the power is generated, it is directed to some utilization, i.e., undergoes some phase of distribution, albeit, by being transported to various sites for redirected transmission or utilization. The present invention is embodied in an unusually uncomplicated adaptation to the station battery to provide vastly improved reliability of the standby battery by effectively providing by-passes for non-functioning cells in a standby battery system. The invention further provides means for monitoring the status and condition of the several cells of the standby battery in order to observe abnormalities at early stages to be able to take advantage of scheduled maintenance or to anticipate imminent failure.

By analogy, battery cells are connected in series like the links in a chain. If one link opens up, the chain fails and any load carried by it is dropped. So it is with a battery. It is composed of cells, analogous to chain links, and if one cell opens, the battery fails and any load supplied by it is dropped. The present invention includes strategically placed diodes in parallel with a predetermined number of cells of the battery to by-pass any open circuit in the battery connection. The diode is analogous to a steel cable connected in parallel with a selected number of successive links. If a link fails, the cable spanning the several links including the failed one takes up the slack occurring with the failed link, maintaining the carrying of the load on the chain until a repair may be affected. If a cell opens, the associated diode by-passes the small group of cells in parallel with a particular diode, and the load on the battery continues to receive current. The monitor associated with the by-pass of the present invention provides information on the balance (or imbalance) of the battery system by observing the deviation of voltages and currents from balanced (normal) conditions in respective sections of the battery system through a simple Wheatstone bridge style of approach. The inventive monitoring system avoids the generation, addition or superimposition, and detection of separate monitoring signals on the existing station battery as well as the expensive and complex electronics required.

The rationale of the present invention is applicable to any electrical facility/system which uses batteries as a means of back-up power. These include substations owned and operated by major process companies such as petrochemical plants, telephone company switching facilities, offshore oil platform power plants, power systems on vessels and large interruptible power supplies (UPS).

BRIEF DESCRIPTION OF THE DRAWINGS

The present invention may be further understood from the following description in conjunction with the appended drawing. In the drawing.

DETAILED DESCRIPTION OF THE PREFERRED EMBODIMENTS

Figure 1:
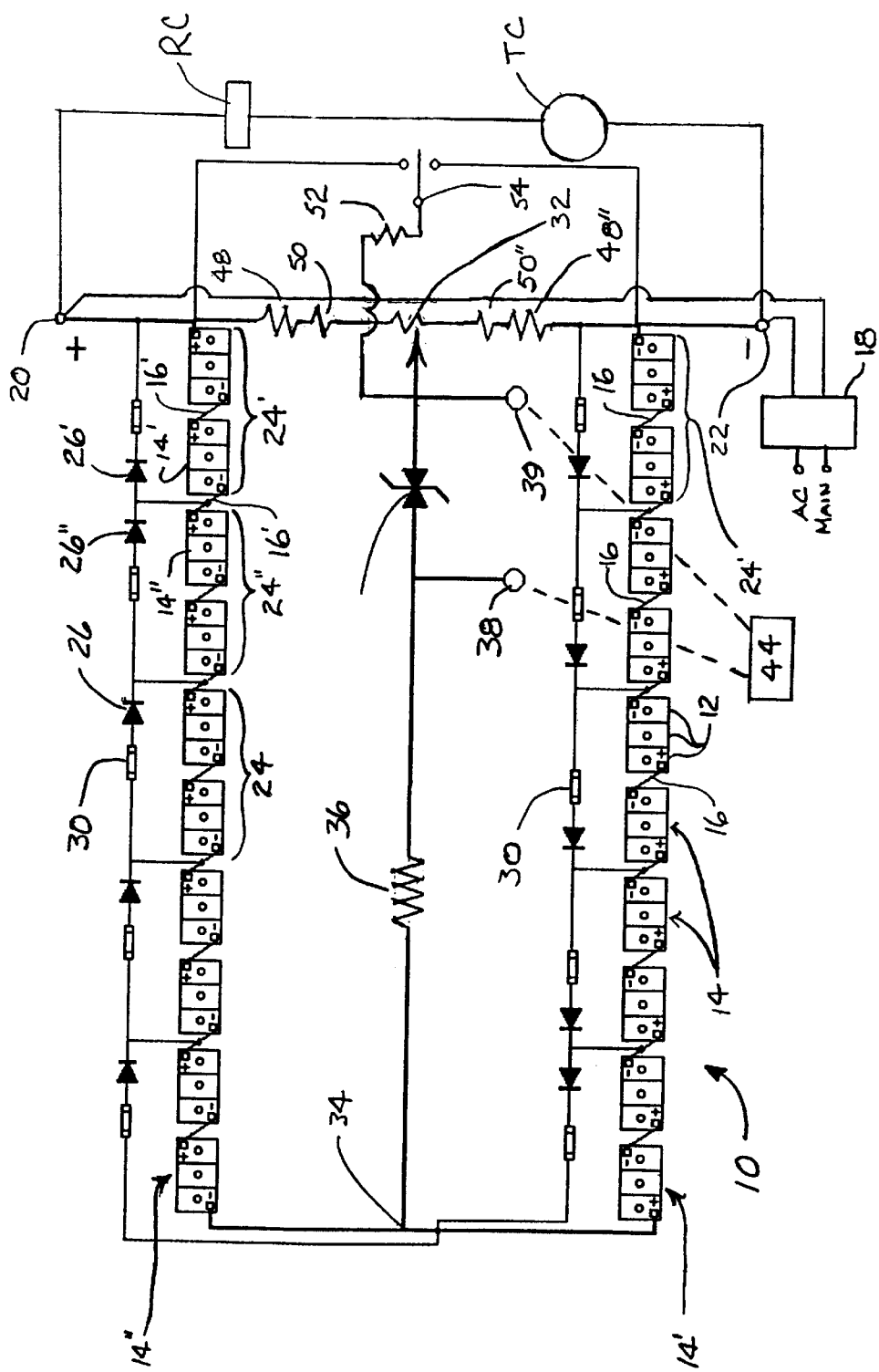
FIG. 1 is a circuit diagram of the station battery including the open circuit protection for cells of the battery according to the present invention.

Adaptation of a typical battery back-up system contained within such as a substation according to the present invention is illustrated in FIG. 1. Individual lead-acid cells 12 are interconnected to form 6 volt "batteries" 14 which are connected in series (numbering twenty in the illustrated embodiment) to form the station battery 10. Batteries 14 are connected in series by a strap 16, being attached in a plus to minus orientation with respect to the adjacent batteries 14. Customarily, batteries 14 are placed in adjacent rows, typically two, with the second row immediately above and behind the first. In such relation, the interconnection of adjacent batteries 14 with straps 16 is conveniently accomplished, including the connection between batteries 14' and 14" at the end of adjacent rows. In the embodiment illustrated in FIG. 1, ten batteries 14 are disposed in each row for a total of twenty batteries. With the nominal voltage of 2 volts for each cell 12, and 6 volts for a battery, the station battery 10 provides a total voltage of nominally 120 volts DC.

Station battery 10 voltage is maintained by a charger 18 (well known in the art) connected to the positive and negative terminals 20, 22 respectively of station battery 10. Charger 18 receives its power from the substation power system (not shown), downloaded from the distribution system which the substation serves. In the illustrated embodiment, the charge is described as a floating charge wherein the battery is continuously connected to an electrical system, including charger and load. The charger is designed to maintain a constant voltage throughout its load range. In the present application for a utility or an industrial electrical generating plant and substation, the battery, charger and load are connected to a common bus. The continuous load is carried by the charger at the normal floating voltage, and the battery draws its own maintenance current at the same time. Any load which exceeds the capacity of charger 18 will lower its voltage slightly, to the point where the station battery discharges to supply the remainder of the demand. If there should be a complete failure of normal power, the battery supplies the entire load until normal power is restored (or so long as battery 10 has capacity), and the battery then recharges.

Also connected to terminals 20, 22 is the load TC (effectively a trip coil in a system switch or circuit breaker) to be powered by the station battery 10 on command of the distribution system control sometimes known as Supervisory Control And Data Acquisition (SCADA) (not illustrated). In series with the load TC is the associated relay control RC which closes the load circuit to cause current to flow from station battery 10 through load TC to activate the selected switch or circuit breaker. Those skilled in the art should appreciate that relay control RC and load TC represent the several switches and/or circuit breakers which are under the control of the SCADA and that the logic of relay control RC determines which, if any, of the specific switches and/or circuit breakers in a particular substation/control regimen are activated responsive to the sensed conditions.

The present invention provides an Open Circuit Protection for the station battery 10 which is non-existent in the present art. As reviewed above, the assured operation of the station battery in those periods of a major fault in a power distribution system is paramount. It is during such a fault that the station battery is put to an immediate, substantial load, and is the most vulnerable to malfunction, should there be a weak point in one or more of the cells 12 of the station battery. The present invention enables not only a more focused monitoring of the elements of the station battery 10, but also a cell/battery by-pass should there be a weak link in the battery 10.

The Open Circuit Protection is accomplished by effectively dividing the station battery 10 into preselected equal battery segments 24. In the present embodiment, each segment comprises two six volt batteries 14 (or six cells 12). Selection of the particular number of cells 12 or batteries 14 is predicated upon the remaining circuit parameters, including the maximum charging current of battery charger 18, the maximum anticipated load at RC and TC and the degree of accuracy of the several station battery parameters which are measured and reported to SCADA, all of which will be subsequently discussed. In practice, a segment 24 will preferably comprise approximately 5% to 15% of the total of the individual cells 12 in station battery 10. In each of the battery segments 24, a back-biased diode 26 (i.e., back biased by the voltage of the cells making up a particular segment 24) is affixed in parallel arrangement with the particular segment 24, being connected to the strap 16 connecting the successive batteries 14 of a segment 24. In the present embodiment for a 60 cell battery system, the diode is a 1N3293A or 1N3293AR which those skilled in the art will recognize as being the same diode with opposite orientations of the anode or cathode connected to the base of the diode. Because of the location of the connecting lug on the base of the diode or on the lead or pigtail, one or the other of the particular diodes will be more easily adapted into the circuit. By way of example, when connecting the first diode 26' between the station battery 10 at the positive terminal to a strap 16' for the first segment 24', the "AR" diode lends itself better because of its threaded, studded base (anode) being more easily connected to the strap 16' and the pigtail (being the cathode) of the diode 26' being connected to the battery cable connection at the positive terminal 20. Conversely, the second diode 26" being also connected to strap 16' and spanning the next successive batteries 14 to form the second segment 24", is more conveniently an "A" type diode, with the cathode based threaded stud being connected to strap 16' adjacent the connection for diode 26'. Those skilled in the art will appreciate that in the present embodiment, straps 16 are essentially short busses which provide sufficient structural integrity for the mounting of such as diodes 26 and fuses 30, should those be desirably included (as later discussed). Similar installations of diodes 26 are disposed in segments 24 throughout the station battery 10.

The above addition of back-biased diodes 26 into segments 24 permits a charging current to continue to flow between the positive terminal 20 through the individual cells to the negative terminal 22 so long as the battery charger 18 is powered. Because of the orientation of the back-biased diodes 26, no current flows through them during charging. Should an open circuit occur, such as a failed cell 12 in any segment 24, charging current will no longer flow since such as a particular cell has opened the series connection of the successive cells 12. However, on the opening of a cell 12 in a particular segment 24, the relevant diode 26 becomes forward biased such that current may flow through it, should there be a load connected to station battery 10. Thus, in the event of a fault in the distribution system and the relay control RC signal the action of a particular switch or circuit breaker, by inserting it into the load (i.e., TC), DC current may be supplied by station battery 10, with the open cell 12 (and the related segment 24) being by-passed though the related diode 26. Current flow from station battery to load RC/TC will be reduced by the capacity of the shunted segment 24, leaving however about 85% to 95% of otherwise unavailable voltage and current will remain available, irrespective of the open cell 12 in the station battery 10. During the particular fault, should the battery charger 18 still be powered, it also may provide up to its maximum rated charge current to supply load RC/TC.

Adjunct to the segmenting of station battery 10 to enhance reliability, fuses 30 maybe added to each segment 24, in series with each diode 26. In the illustrated embodiment, conventional, in line fuses such as BUSS ANL 100 are conveniently inserted by means of including a fuseholder, such as BUSS 4164 in series with each diode 26 in successive segments 24. The fuse is sized according to the current carrying components in the station battery system, including the straps 16, diodes 26, and the included connectors, wiring and environmental factors.

Figure 2:
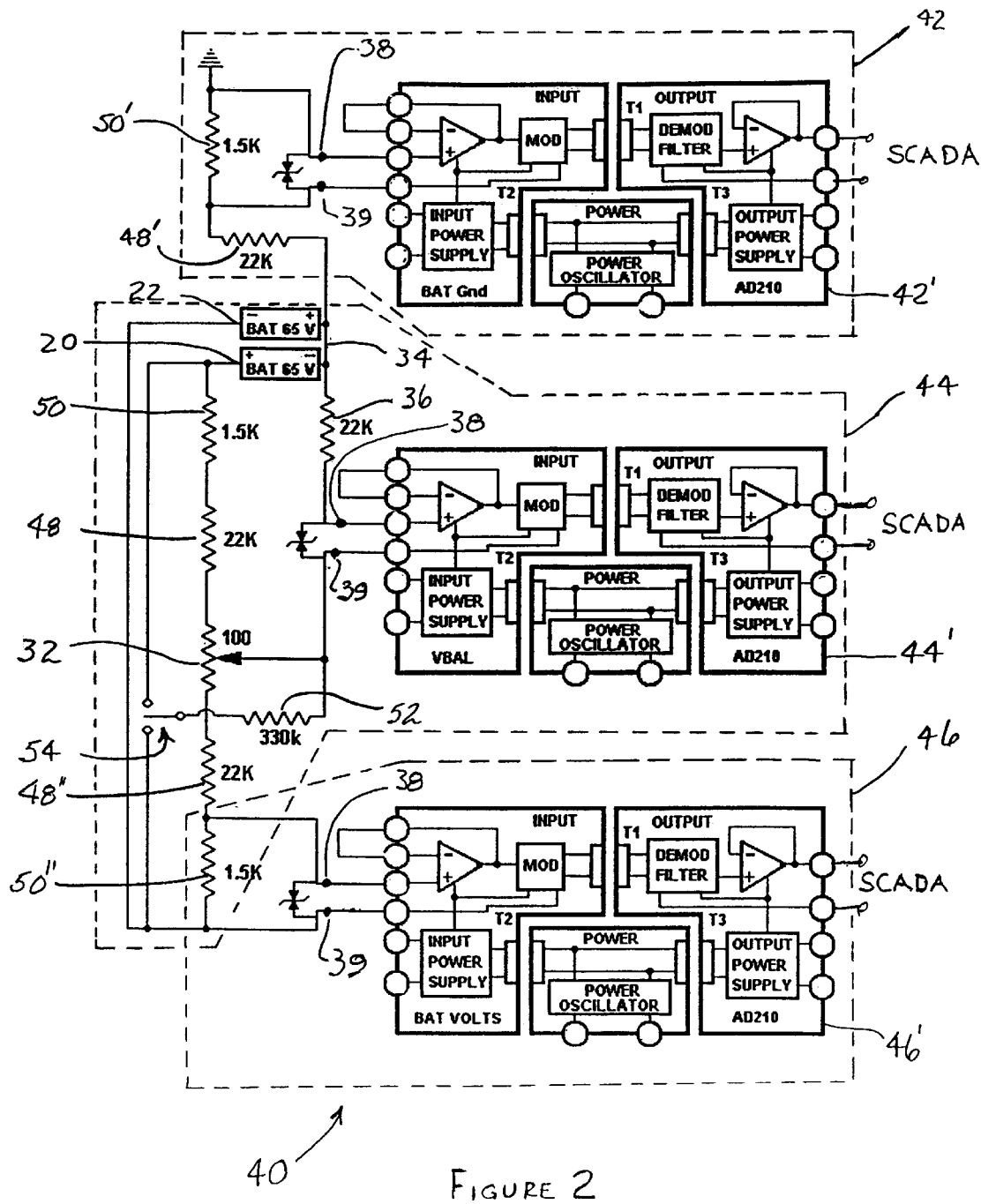
FIG. 2 is a circuit diagram of the station monitor circuit including monitoring of the ground status of the station battery terminals, open circuit status and voltage indication of the station battery according to the present invention.

Referring now to FIG. 2, to obtain full benefit of the inventive Open Circuit Protection means are included to observe the status of the station battery, and to provide information and alarms should the cells 12 of the station battery exhibit such as an open or shorted cell and the like. Accordingly, there is included an Station Monitor Circuit 40 which includes Ground Detection Circuit 42, Open Circuit Monitor 44 and Voltage Indicator Circuit 46. The core of the Station Monitor Circuit is a resistive voltage divider network (i.e., a Wheatstone bridge) wherein one end of the circuit is connected to center tap 34 and includes a current limiting resistor 36. The other end of the network is connected to the positive and negative terminals 20, 22 of station battery and includes voltage divider resistors 48, 48" and scaling resistors 50, 50". The center of the bridge is located at meter taps 38,39 which are connected to each of the monitoring circuits Ground Detection Circuit 42, Open Circuit Monitor 44 and Voltage Indicator Circuit 46. Each circuit reads the voltage across the relevant scaling resistor and supplies the value (voltage) to the SCADA control by being routed through an isolation amplifier 42', 44' and 46', such as an Analog Devices AD210AN or a Simpson Hawk H 235 in the illustrated embodiment and schematically illustrated in FIG. 2. Signals generated in Station Monitor Circuit 40 are filtered through isolation amplifier 45 in order that the provided signal is free of transients common in power distribution systems so that the transients don't obscure or cause false readings as SCADA reads and interprets the incoming signal.

Ground Detection Circuit 42 includes its dedicated resistor divider wherein one end of the circuit is connected to center tap 34 and the other end is connected to ground as at ground tap 43, having intermediately placed voltage divider resistor 48' and scaling resistor 50'. Station battery is normally "floating" so, by having a voltage divider connected to ground such that should either of the appropriate positive or negative terminals 20, 22 be other than solidly connected, a change in the nominal current for the solid condition will occur. In the instance of a solid connection, the Ground Detection Circuit 42 of the illustrated embodiment provides a voltage in the range of 3 to 10 volts DC because of the size (number of cells) of the station battery 10 and the resistor 48', 50' values selected in the illustrated embodiment, as those skilled in the art will recognize. A station battery 10 for a substation is conventionally provided with a ground fault detector operating in a manner not significantly dissimilarly to that illustrated.

Open Circuit Monitor 44 of the present invention provides enhanced monitoring of the status of the station battery 10 by monitoring voltage and current in selected portions of the station battery circuit. Open Circuit Monitor 44, as previously mentioned, incorporates a precision voltage divider in the form of a Wheatstone bridge, which is center tapped to the station battery 10, as at 34, and terminates at battery terminals 20, 22 having monitor taps 38, 39 disposed intermediately in the divider where the traditional galvanometer of the Wheatstone bridge would otherwise be. Open Circuit Monitor 44 is connected to the control system SCADA by means of monitor taps 38, 39 and the related isolation amplifier, as further illustrated in FIG. 2. The other leg of the bridge (opposite the center tap) includes combinations of voltage dividing resistors 48, 48" and scaling resistors 50, 50" connected respectively to the positive and negative terminals 20, 22 of battery 10. Balancing resistor 32 is interposed between meter tap 39 and the resistor legs 48, 50 and 48", 50" to provide adjustment for balancing the divider during normal operating conditions, as is known in the art. Additionally, a test function for simulating the degree of imbalance occasioned by a cell event is included by means of test circuit resistor 52 (for voltage imbalance) and test switch 54 which are connected to the station battery terminals 20, 22 for monitoring the status of the respective halves of station battery 10, and illustrated in greater detail in FIG. 2.

Accordingly, when an event occurs in one or the respective sides of the bank of batteries 14, such as an open cell, or shorted cell, the balance of the bridge will be affected causing a voltage to be developed across terminals 38, 39 and input to the isolation amplifier portion 44' of Open Circuit Monitor 44, to be forwarded to the SCADA control system. According to the programmed sensitivity settings in the SCADA, the deviation in the bridge will be noted and recorded, and if at a sufficient level, an alarm will be sounded. In a power distribution system, the SCADA is programmed to initiate various functions in the system and in actuality, the signals are analyzed and actions initiated in a central master control connected to regional SCADA systems.

In operation Open Circuit Monitor 44 monitors the condition of the cells 12 making up battery segments 24 and evaluates malfunctions of cells 12. Vernier resistor 32 is adjusted to balance the system during normal operation allowing for accurate monitoring by Open Circuit Monitor 44 of the battery segments 24 and condition of cells 12 so that when a cell abnormality such as a weak cell, shorted cell or high resistance cell occurs, it may be noted by SCADA and maintenance may be scheduled. Absent the present invention, any open cell noted conventionally, as by monitoring a deviation in the gross voltage at the battery charger, would require immediate maintenance on the station battery 10 since it would be unable to supply current to load RC/TC to operate a switch or circuit breaker in the event of a system fault. With the present invention incorporating Open Circuit Protection, the diode 26 provides a by-pass of an individual open cell 12 so as to preserve the functionality of the station battery 10 in the event of a fault. Should an open circuit occur in a particular cell 12, the battery charger 18 can no longer continue to charge the series arrangement of cells 12 in the affected battery segment 24 containing the defective cell. The half of the station battery containing the open cell (i.e., by-passed segment 24) will gradually decay from its float voltage during charge to a quiescent voltage, perhaps 10 volts in a 120 volt system as illustrated. The half of the station battery 10 not having the open cell will rise in voltage such that the sum of the two halves will equal the battery charger 18 voltage. The voltage difference between the two halves appears across the previously balanced bridge and is observable across terminals 38,39. The voltage thus observed by the Open Circuit Monitor 44 is, preferably through a buffering isolation amplifier 44', provided to SCADA, where it is programmed to record the information and/or trigger an alarm to call attention to the need of maintenance on the station battery. Because of the inclusion of the above described inventive Open Circuit Protection, a call for a load on the station battery by such as a distribution system fault, may still be answered since the relevant diode 26 would permit the remainder of the series of cells 12 of the unaffected battery segments 24 to discharge and supply the necessary current to a relay control RC for the tripping of a switch or circuit breaker TC. Open circuit Monitor 44 also provides for observing the general condition of the respective halves of station battery 10. Inclusion of manual test switch 54 enables the absolute voltage on the respective halves of station battery to be simulated and measured when switch 54 (normally open) to be closed to the respective sides of the contacts at 54. Accordingly, the voltage imbalance across the relevant half of the battery simulated by test resistor 52 may be read at terminals 38, 39 and supplied to SCADA as described above, providing an indication of the nature of a cell 12 defect on one of the halves, i.e. open cell or shorted cell.

Voltage Indicator Circuit 46 provides an indication of the condition of the battery charger 18 and the related system. This voltage is monitored by means of monitoring the voltage across one of the scaling resistors 50", as illustrated in FIG. 2. With the component values of the illustrated system, (i.e., the similar values of resistors 48, 48' and 48" and 50, 50' and 50") this voltage during normal operation will be on the order of 3 to 10 volts DC which is buffered in isolation amplifier 46' and provided to SCADA as the absolute value of the voltage across the station battery (i.e., output of the battery charger) to provide for continued observation of this parameter. Those familiar with electric distribution systems will recognize that this voltage monitoring is similar to voltage indicators in conventional substation systems.

The following table lists the parts numbers and parts descriptions as used herein and in the drawings attached hereto:

| PARTS LIST | |
|---|---|
| Part No. | Description |
| 10 | station battery |
| 12 | battery cells |
| 14 | battery |
| 14' | battery |
| 14" | battery |
| 16 | strap |
| 16' | strap |
| 16" | strap |
| 18 | battery charger |
| 20 | station battery positive terminal |
| 22 | station battery negative terminal |
| 24 | battery segment |
| 26 | diode |
| 26' | diode |
| 26" | diode |
| 30 | fuse |
| 32 | precision voltage divider |
| 34 | center tap |
| 36 | current limiting resistor |
| 38 | meter tap |
| 40 | station monitor circuit |
| 42 | Ground Detection Circuit |
| 42' | isolation amplifier |
| 43 | ground tap |
| 44 | Open Circuit Monitor |
| 44' | isolation amplifier |
| 46 | Voltage Indicator Circuit |
| 46' | isolation amplifier |
| 48 | voltage divider resistor |
| 48' | voltage divider resistor |

-continued

PARTS LIST

| Part No. | Description |
| --- | --- |
| 48" | voltage divider resistor |
| 50 | scaling resistor |
| 50' | scaling resistor |
| 50" | scaling resistor |
| 52 | test resistor |
| 54 | test switch |
| RC | relay control |
| TC | load, i.e., relay trip coil |

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, on all changes which come within the meaning and range of equivalents thereof are intended to be embraced therein.

I claim:

1. A battery bank including a plurality of serially connected battery cells making up a bank of standby batteries coupled in parallel with a battery charger and a DC powered load comprising:

a plurality of back-biased diodes, each of said diodes connected in parallel with a predetermined number of said battery cells forming designated successive segments of said serially connected battery cells, each segment of cells having a diode connected in parallel with the cells of the segment, the predetermined number of diodes being a whole number divisor of the total number of battery cells, whereby, when at least one of a battery cell in a designated segment becomes an open cell, the diode associated with the segment including the open cell becomes forward biased such that the series connection between the adjacent segments is closed through said diode and the serially connected segments of battery cells remains conductive.

2. The battery bank of claim 1 wherein said predetermined number is between about 5% and about 15% of the total number of individual battery cells.

3. In an electric power distribution system, a battery open circuit monitor for detecting abnormalities in a plurality of serially connected battery cells making up a bank of standby batteries coupled in parallel with a battery charger and a DC powered load and including a circuit for bypassing battery cells experiencing electrical abnormalities in the plurality of serially connected battery cells making up the bank of standby batteries comprising:

a plurality of back-biased diodes, each of said diodes connected in parallel with a predetermined number of said battery cells for forming designated segments of said serially connected battery cells having a diode connected in parallel with the cells of the designated segment;

whereby, when one of a battery cell in a segment becomes an open cell, the diode associated with the segment including the open cell becomes forward biased such that the series connection between the adjacent designated segments is closed through said diode and the plurality of serially connected segments of battery cells remains conductive;

a voltage divider network including a first leg connected to the electrical mid-point of said plurality of serially connected battery cells, said first leg being connected to a galvanometer, and said voltage divider network further including a second leg and a third leg, each of said second and third legs being connected to said galvanometer and respectively, the positive terminal and the negative terminal of said bank of standby batteries;

said second and said third legs each having included therein a resistor to electrically balance said voltage divider network during normal operation of the bank of standby batteries;

whereby said galvanometer provides an indication of electrical imbalance relative to said second leg and said third leg and their associated battery cells when a cell experiences an electrical abnormality.

4. The monitor of claim 3 wherein said selected electrical value is voltage.

5. The monitor of claim 3 wherein said galvanometer is connected to the control system of an electrical power distribution system whereby said galvanometer provides an input of the selected electrical value to the control system.

6. The monitor of claim 4 wherein said galvanometer is connected to the control system through an isolation amplifier.

7. The monitor of claim 3 wherein said galvanometer is connected to the control system by means of a radio frequency transmission.

8. The monitor of claim 3 wherein said first leg said galvanometer is connected in series with a precision resistor and a switch and said voltage divider network includes a fourth leg and a fifth leg, each of said legs each of said fourth and fifth legs are connected to said galvanometer and respectively, the positive terminal and the negative terminal of said bank of standby batteries;

whereby said galvanometer provides an indication of a selected electrical value relative to said fourth leg and said fifth leg and their associated battery cells.

9. In an electric power distribution system having a substation with a station battery, the battery including a plurality of serially connected battery cells making up a battery bank of standby batteries coupled in parallel with a battery charger and a DC powered load comprising:

a plurality of back-biased diodes, each of said back-biased diodes connected in parallel with a selected number of said successive serially connected battery cells, each being back-biased by the voltage across said successive serially connected cells, thereby forming successive designated segments of said serially connected battery cells, each designated segment of cells having a diode connected in parallel with the cells of the designated segment;

whereby, when a battery cell in a designated segment becomes an open cell, the diode associated with the segment including the open cell becomes forward biased such that the series connection between the adjacent segments is closed through said diode and the serially connected segments of battery cells remains conductive.

10. The battery bank of claim 9 wherein each designated segment includes an equal number of cells.

11. The battery bank of claim 9 wherein the number of diodes is a whole number divisor of the total number of serially connected cells.

12. The battery bank of claim 11 wherein the number of diodes is between about 5% and about 15% of the total number of individual battery cells.

13. The battery bank of claim 12 further including a voltage divider network comprising a first leg connected to the electrical mid-point of said plurality of serially connected battery cells, said first leg being connected to a galvanometer, and said voltage divider network further including a second leg and a third leg, each of said second and third legs being connected to said galvanometer and respectively, the positive terminal and the negative terminal of said bank of standby batteries;

said second and said third legs each having included therein a resistor to electrically balance said voltage divider network during normal operation of the bank of standby batteries;

whereby said galvanometer provides an indication of electrical imbalance relative to said second leg and said third leg and their associated battery cells when a cell experiences an electrical abnormality.

14. The battery bank of claim 13 wherein said voltage divider network includes a fourth leg and a fifth leg, each of said legs at one end being connected respectively to the positive terminal of said bank of batteries and the negative terminal of said bank of batteries, and each of said legs at their other end being connected respectively to one of the poles of a double pole, single throw switch, and the throw of said switch being connected through a voltage drop resistor to said galvanometer and said first leg of said voltage divider whereby the voltage of the cells respectively between the midpoint of said band and the positive terminal and the negative terminal of said battery may be measured.

15. The battery bank of claim 13 wherein said galvanometer is connected to the control system of the electrical power distribution system whereby said galvanometer provides an input of the selected electrical value to the control system.

16. The battery bank of claim 15 wherein said galvanometer is connected to the control system through an isolation amplifier.

17. The battery bank of claim 15 wherein said galvanometer is connected to the control system by means of a radio frequency transmission.

18. The battery bank of claim 14 wherein said galvanometer is connected to the control system of the electrical power distribution system whereby said galvanometer provides an input of the selected electrical value to the control system.

19. The battery bank of claim 18 wherein said galvanometer is connected to the control system through an isolation amplifier.

20. The battery bank of claim 18 wherein said galvanometer is connected to the control system by means of a radio frequency transmission.

* * * * *